(12) United States Patent
Moore

(10) Patent No.: US 8,875,296 B2
(45) Date of Patent: Oct. 28, 2014

(54) METHODS AND SYSTEMS FOR PROVIDING A FRAMEWORK TO TEST THE SECURITY OF COMPUTING SYSTEM OVER A NETWORK

(75) Inventor: H. D. Moore, Boston, MA (US)

(73) Assignee: Rapid7, LLC, Boston, MA (US)

( * ) Notice: Subject to any disclaimer, the term of this patent is extended or adjusted under 35 U.S.C. 154(b) by 0 days.

(21) Appl. No.: 13/418,918

(22) Filed: Mar. 13, 2012

(65) Prior Publication Data

US 2012/0240235 A1    Sep. 20, 2012

Related U.S. Application Data

(60) Provisional application No. 61/452,744, filed on Mar. 15, 2011, provisional application No. 61/452,532, filed on Mar. 14, 2011.

(51) Int. Cl.
*G06F 21/00* (2013.01)
*H04L 29/06* (2006.01)
*G06F 21/57* (2013.01)

(52) U.S. Cl.
CPC .......... *H04L 63/1433* (2013.01); *G06F 21/577* (2013.01); *G06F 21/00* (2013.01)
USPC ............................................. 726/25

(58) Field of Classification Search
None
See application file for complete search history.

(56) References Cited

U.S. PATENT DOCUMENTS

2003/0014669 A1 *  1/2003  Caceres et al. ................ 713/201
2009/0235359 A1 *  9/2009  Abdulhayoglu et al. ....... 726/25

* cited by examiner

*Primary Examiner* — Gilberto Barron, Jr.
*Assistant Examiner* — Malcolm Cribbs
(74) *Attorney, Agent, or Firm* — MH2 Technology Law Group, LLP

(57) ABSTRACT

A security tool can utilize a vulnerability in a computing system or credentials for the computing system to gain access to the computing system. Once access is gained, the security tool can deliver an agent to the computing system. The agent can execute, detected or undetected, on the computing system in order to establish a network link between the computing system and the security tool. Once established, the security tool creates a virtual network interface on the computing system on which it is running and instructs the agent to relay network traffic between the virtual network interface of the computing system executing the security tool and the existing network interfaces of computing system executing the agent.

30 Claims, 4 Drawing Sheets

METHODS AND SYSTEMS FOR PROVIDING A FRAMEWORK TO TEST THE SECURITY OF COMPUTING SYSTEM OVER A NETWORK

CROSS-REFERENCE TO RELATED APPLICATIONS

This application claims priority to U.S. Provisional Patent Application Ser. No. 61/452,532 filed on Mar. 14, 2011 and U.S. Provisional Patent Application Ser. No. 61/452,744 filed on Mar. 15, 2011, the disclosures of which are incorporated in their entirety by reference herein.

FIELD

Aspects of the disclosure relate generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Additionally, the users' connection to the public networks provides a window for malicious entities to attack the users' computing systems. Malicious entities utilize this ease of accessibility and anonymity to attack the users' system remotely across the public networks. For example, the malicious entities can plant viruses, Trojans, or other malicious software in publicly available content in order to attack the users' computing systems and steal sensitive information from the users.

To prevent attacks on computing systems, the administrators and owners of computing systems desire to identify possible security threats before they can be attacked by malicious entities. This, however, can be a difficult task. Often, the administrator must individually examine each computing system to identify possible weaknesses. The administrators can utilize tools to remotely examine the computing system. These tools, however, lack flexibility in examining the computing systems and, often, specialized routines and custom application programs must be developed for each specific computing system.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for testing and analyzing the security of a network of computing systems. In particular, a security tool can utilize a vulnerability in a computing system or credentials for the computing system to gain access to the computing system. Once access is gained, the security tool can deliver an agent to the computing system. The agent can execute on the computing system in order to establish a network link between the computing system and the security tool. Once established, the security tool creates a virtual network interface on the computing system on which it is running and instructs the agent to relay network traffic between the virtual network interface of the computing system executing the security tool and the existing network interfaces of computing system executing the agent. This process functions as a virtual private network (VPN) connection between the security tool and the agent. Once established, the security tool can be configured to utilize the VPN connection to test and analyze the security of the computing system or other computing systems that are connected to the computing system.

Accordingly, the security tool can, in real time, identify and analyze security threats to a computing system and provide details of the threats to a user of the security tool. Likewise, by establishing a fully-functional VPN connection, the security tool can test and analyze the computing system without creating unique and specialized commands and routines for each computing system.

Figure 1:
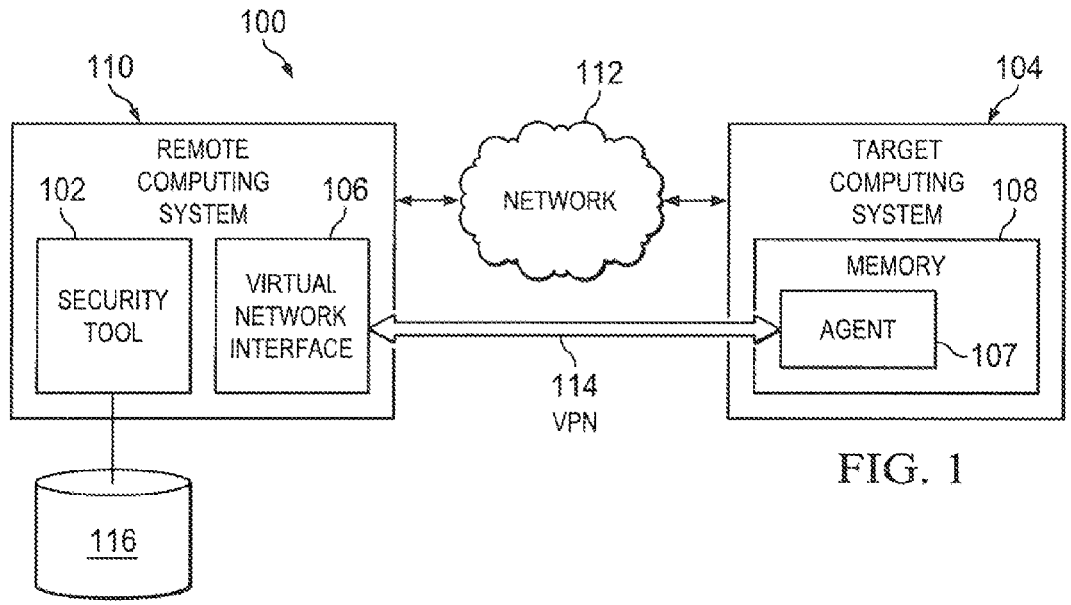
FIG. 1 is block diagram of an exemplary environment in which a security tool can test and analyze computing systems, according to various embodiments.

FIG. 1 illustrates an exemplary environment 100 in which a security tool 102 can test and analyze the security of a target computing system 104 utilizing a virtual network interface 106 and an agent 107. While FIG. 1 illustrates various systems contained in the environment 100, one skilled in the art will realize that these systems are exemplary and that the environment 100 can include any number and type of systems.

As illustrated in FIG. 1, the target computing system 104 can represent the system of public or private entities, such as governmental agencies, individuals, businesses, partnerships, companies, corporations, etc., utilized to support the entities. The target computing system 104 can be any type of conventional computing system, such as desktop, laptop, server, etc., or mobile device, such as a smart telephone, tablet computer, cellular telephone, personal digital assistant, etc. The target computing system 104 can include hardware resources, such as processors, memory, network hardware, storage devices, and the like, and software resources, such as operating systems (OS), application programs, and the like.

In particular, the target computing system 104 can include a physical memory 108, such as random access memory (RAM).

The environment 100 can also include a remote computing system 110 located remotely from the target computing system 104. The remote computing system 110 can be any type of conventional computing system, such as desktop, laptop, server, etc. The remote computing system 110 can include hardware resources, such as processors, memory, network hardware, storage devices, and the like, and software resources, such as OS, application programs, and the like. The target computing system 104 and the remote computing system 110 can be coupled to one or more networks 112. The one or more networks 112 can be any type of communications networks, whether wired or wireless, to allow the computing system to communicate, such as wide-area networks or local-area networks. The security tool 102 can be configured to utilize the network 112 to communicate with the target computing system 104.

In embodiments, the owners, administrators, and users of the target computing system 104 and/or remote computing system 110 can desire to test and analyze the security of the target computing system 104 utilizing the security tool 102. The security tool 102 can be configured to provide an interface and tools whereby a user can test and analyze the security of the target computing system 104. To achieve this, the security tool 102 can be configured to deliver the agent 107 to the target computing system 104. The agent 107 can be configured to execute, detected or undetected, on the target computing system 104 in order to establish a network link between the target computing system 104 and the security tool 102. Once established, the security tool 102 can be configured to create a virtual network interface 106 on the remote computing system 110 on which it is running. The security tool 102 can be configured to instruct the agent 107 to relay network traffic between the virtual network interface 106 of the remote computing system 110 executing the security tool 102 and the existing network interfaces of target computing system 104 executing the agent 107. The virtual network interface 106 can be any type of virtual network interface such as a TAP interface and/or other types of virtual network devices.

In embodiments, the virtual network interface 106 and the agent 107 can be configured to operate on the remote computing system 110 and the target computing system 104 to provide a fully-functional virtual private network (VPN) connection 114 between the security tool 102 and the agent 107. The agent 107 can be configured to operate as a simulated or virtual network interface, such as a simulated Ethernet device operating at layer 2 or data link layer of the Open System Interconnection (OSI) model. In particular, the agent 107 can be configured to inject frames into the network stack of a network interface device of the target computing system 104 in order to communicate with the security tool 102 or other computing systems. As such, the agent 107 can establish and utilize the VPN connection 114 without alerting the network interface device.

Additionally, to provide the VPN connection 114, the agent 107 can be configured to also provide-network layer (layer 3) communications, such as Internet Protocol (IP) packets, and transport layer (layer 4) communications, such as transmission control protocol (TCP) communications and user datagram protocol (UDP) communications. To operate as the virtual network interface, the agent 107 can be configured to receive network communications, such as packets, from the security tool 102, via the virtual network interface 106 and deliver the network communications to the network stack of the target computing system 104. Likewise, the agent 107 can be configured to pass network communications of the target computing system 104 to the security tool 102.

In embodiments, the security tool 102 can be configured as an application program that is capable of being stored on and executed by the computing systems of the environment 100, such as the remote computing system 110. For example, the security tool 102 can be an application program such as Nexpose™ or Metasploit from Rapid7, LLC. The security tool 102 can be written in a variety of programming languages, such as Ruby, JAVA, C++, Python code, Visual Basic, hypertext markup language (HTML), extensible markup language (XML), and the like to accommodate a variety of operating systems, computing system architectures, etc. Likewise, the agent 107 can be configured as an application program, program module, and/or routine that is capable of being stored in the memory 108 of the target computing system 104 and executed in the memory 108 of the target computing system 104. The agent 107 can be written in a variety of programming languages, such as Ruby, JAVA, C++, Python code, Visual Basic, hypertext markup language (HTML), extensible markup language (XML), and the like to accommodate a variety of operating systems, computing system architectures, etc.

In embodiments, the security tool 102 can be configured to deliver the agent 107 to the target computing system 104 via the network 112. The security tool 102 can be configured to deliver the agent 107 in a manner to prevent the target computing system 104 from detecting the presence of the agent 107. To achieve this, the security tool 102 can be configured to identify and to utilize a vulnerability in the target computing system 104 to deliver the agent 107. A vulnerability can be any type of weakness, bug, and/or glitch in the software resources and/or hardware resources of the target computing system 104 that can allow the security of the target computing system 104 to be compromised. For example, a vulnerability in the software resources can include, for example, software that is out of date, software that has known security weakness, configurations of software that have known security weaknesses, known bugs of software, etc. Likewise, a vulnerability in the hardware resources can include, for example, known bugs in hardware, configurations of hardware that have known security weaknesses, etc.

Likewise, the security tool 102 can be configured to utilize credentials (e.g. access identification and password) of the target computing system 104 to deliver the agent 107. The security tool 102 can be configured to determine the credentials through any number of methods, such as examining the password file of the target computing system 104.

For example, a vulnerability can exist in the access security for the Windows® operating system by Microsoft® Corporation. An exploit can exist for attacking Windows' access using password hashes, such "pass the hash" technique. In this example, the "pass the hash" technique involves stealing a password file that contains the hashes of passwords for Windows and utilizing the hashes of passwords, to identify vulnerabilities in the target computing system 104. In embodiments, the security tool 102 can deliver an exploit to the target computing system 104 that scans the target computing system 104 for a password hash file and can perform the "pass the hash" technique in order to identify a vulnerability in the Windows operating system.

To identify a vulnerability, the security tool 102 can be configured to examine the target computing system 104 to identify the software resources and the hardware resources of the target computing system 104 and to scan for vulnerabilities. For example, the security tool 102 can be configured to scan the target computing systems 104 in order to identify the details of the software resources of the computing systems (type of software installed, e.g. OS and application programs, version of the software installed, configuration of the software installed, etc.) and the details of the hardware resources (type of hardware, configuration of the hardware, etc.).

Once the software and hardware resources are identified, the security tool 102 can be configured to compare the details of the software resources and the details of the hardware resources to a vulnerability database 116. The vulnerability database 116 can be configured to store a record of known vulnerabilities for various types of known software resources and hardware resources. The security tool 102 can be configured to compare the identified details of the software resources and hardware resources of the target computing system 104 to the vulnerability database 116 in order to identify vulnerabilities in the computing system 104. Likewise, the security tool 102 can be configured to specifically scan the target computing system 104 for one or more of the vulnerabilities stored in the vulnerability database 116. The vulnerability database 116 can be configured according to any type of proprietary or open-source database format or scheme.

In embodiments, once delivered, the agent 107 can be configured to operate on the target computing system 104 in a manner to prevent detection by the target computing system 104. When operating as the simulated network interface, the agent 107 can be configured to obtain and utilize network identifiers, such as media access control (MAC) addresses and IP address, in a manner to prevent the detection of the agent 107 by the target computing system 104 or other computing system associated with the target computing system 104. Likewise, the agent 107 can be configured to establish, maintain, and communicate via the VPN connection 114 in a manner to prevent detection by the target computing system 104 or other computing system associated with the target computing system 104.

Figure 2:
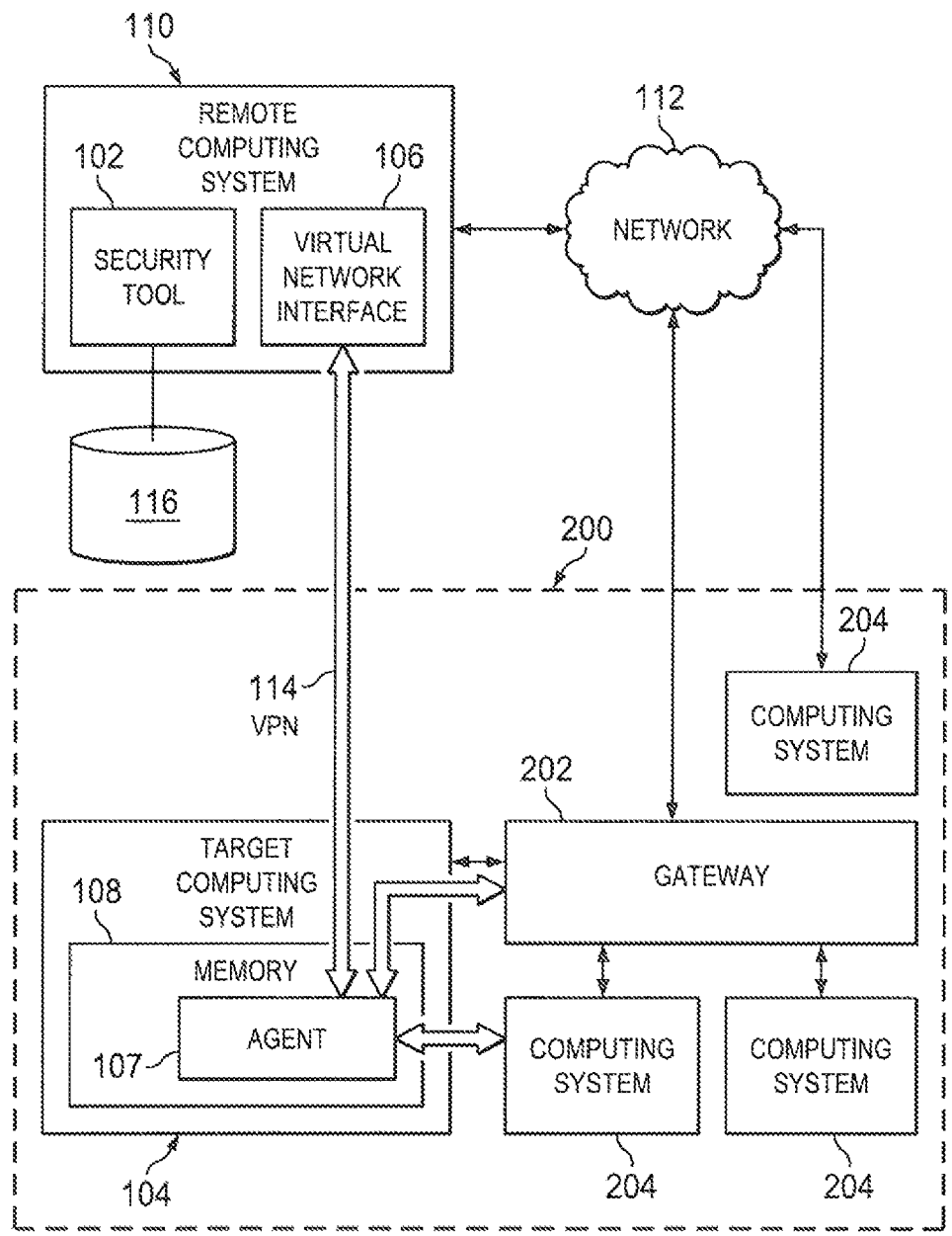
FIG. 2 is a block diagram of another example of the environment in which a security tool can test and analyze computing systems, according to various embodiments.

In embodiments, the target computing system 104 can be a component of a network of computing systems. FIG. 2 illustrates another example of the environment 100 in which the target computing system 104 can be part of a network 200 of computing system. In this example, the owners, administrators, or operator of the network 200 can desire to test the security of the network 200 and identify any vulnerabilities in the network 200 or the computing system of the network. While FIG. 2 illustrates various systems contained in this example of the environment 100, one skilled in the art will realize that these systems are exemplary and that the environment 100 can include any number and type of systems.

As illustrated in FIG. 2, the network 200 can include the target computing system 104, a gateway 202, and computing systems 204. As mentioned above, the network 200 can represent the computing systems of public or private entities, such as governmental agencies, individuals, businesses, partnerships, companies, corporations, etc. The computing systems of network 200 can be located at any location, whether located at single geographic location or remotely located from each other. For example, the target computing system 104, the gateway 202, and the computing systems 204 can represent the computing systems of a company that are located in multiple geographic locations. As such, the target computing system 104 and one or more of the computing systems 204 can be located at one location (e.g. one office of the company) and one or more of the computing systems 204 can be located at one or more different locations (e.g. satellite offices of the company). In order to communicate and share data, the gateway 202, the computing systems 204, and the target computing system 104 can be coupled to the network 112.

The gateway 202 can include one or more computing systems, such as servers, that are configured to communicate with the computing system of the network 200. The gateway 202 can be configured as "overlord" or host computing system that communicates with underlying or low-level computing systems of the network 200. The computing systems 204 can be any type of conventional computing systems similar to the target computing system 104, such as desktops, laptops, servers, etc. The computing systems 204 can include hardware resources, such as processors, memory, network hardware, storage devices, and the like, and software resources, such as OS, application programs, and the like.

In embodiments, as mentioned above, to test the computing systems of the network 200, the security tool 102 can be configured to identify the target computing system 104 as being able to support the agent 107, and configured to deliver the agent 107 to the target computing system 104. To identify the target computing system 104, the security tool 102 can be configured to scan any of the gateway 202, the computing systems 204, and the target computing system 104. The security tool 102 can be configured to scan the gateway 202, the computing system 204, and the target computing system 104 in order to identify which of the computing systems has a vulnerability that will allow the agent 107 to operate. For example, as illustrated in FIGS. 1 and 2, the security tool 102 can determine that the agent 107 can operate on the target computing system 104. One skilled in the art will realize that any of the gateway 202 and computing systems 204 can contain a vulnerability which will allow the agent 107 to operate detected or undetected, and realize that the security tool 102 can identify and deliver the agent 107 to that computing system. Likewise, the security tool 102 can be configured to deliver the agent 107 to the target computing system 104 without concern of detection by the target computing system 104. For example, the owner or administrator of the network 200 can desire to test the security of the computing system of the network 200 and allow the agent 107 to execute on the target computing system 104.

In embodiments, once the agent 107 is delivered and the VPN connection 114 is established, the security tool 102 can be configured to communicate with the agent 107 via the virtual network interface 106 in order to test and analyze the security of the target computing system 104 and other computing system in the network 200. In particular, the agent 107 can be configured to relay network traffic received by the target computing system 104 from other computing systems in the network 200 to the security tool 102. The security tool 102 can be configured to utilize the agent 107 to perform security testing on the target computing system 104. The security testing can be any type of routine, procedure, algorithm, application program, data, series of commands, instructions, etc. which can test and analyze the security of the target computing system 104 and provide data about the test to the security tool 102 via the VPN connection 114.

In embodiments, the security tool 102 can be configured to perform and/or deliver exploits to the target computing system 104 utilizing the VPN connection 114. An exploit can be a theoretical or actual method for utilizing a potential vulnerability in order to compromise the target computing system 104. For example, an exploit can be a procedure, algorithm, application program, data, series of commands, etc. that can utilize the vulnerability to compromise the security of a computing system. The security tool 102 can be configured to deliver and execute the exploit on the target computer system 104 and configured to receive data, back from the exploit. For example, the data can describe the vulnerabilities existence and the exploits ability to utilize the vulnerability of the target computing system 104.

In embodiments, the security tool 102 can be configured to deliver application programs that can perform various actions on the target computing system 104 and provide data to the security tool 102 via the VPN connection 114. The application programs can be configured to test the security of the target computing system 104, such as a network vulnerability scanner, and provide the data about the vulnerability scan back to the security tool 102. Likewise, the application programs can be configured to collect configuration information from the target computing system 104, such as type and configuration of hardware installed, type of software installed, network settings (IP-address, user name, password), user setting (user name, password), and the like, and configured to provide the collected configuration information to the security tool 102 via the VPN connection 114.

In embodiments, the security tool 102 can be configured to deliver, various commands, for example system calls, that cause the target computing system 104 to perform various actions and provide data to the security tool 102 via the VPN connection 114. The command can be an application programming interface (API) call that causes the target computing system 104 to perform certain actions. For example, the security tool 102 can provide an API call to obtain an IP address and provide the IP address to the security tool 102. Likewise, for example, the security tool 102 can provide an API call to fork a new process on the target computing system 104. Also, for example, the security tool 102 can provide an API call that disables application programs running on the target computing system 104, such as antivirus programs. Additionally, for example, the security tool 102 can provide an API call that emulates a local portal operating system interface for Unix operating system (POSIX) API and that intercepts calls to the OS of the target computing system 104 and replaces the calls with its own calls, thereby operating as a virtual machine. While several examples of commands provided by the security tool 102 are described above, one skilled in the art will realize that security tool 102 can provide any type of command that can cause the target computing system to perform actions in order to identify weakness in the security of the target computing system 104.

In embodiments, as described above, the security tool 102 can provide exploits, application programs, commands, etc. to the target computing system 104 in order to test and analyze the security of the target computing system 104. The agent 107 can be configured to relay network traffic between the target computing system 104 and the other computing systems of the network 200. The security tool 102 can be configured to analysis the network traffic, for example, with a vulnerability scanner, to identify weakness and/or vulnerabilities in the target computing system 104 and/or the other computing systems of the network 200. Likewise, in embodiments, the security tool 102 can provide exploits, application programs, commands, etc. to the target computing system 104 that test and analyze the security of the other computing systems in the network 200 (e.g. gateway 202 and computing system 204). For example, the exploits, application programs, commands, etc. can be configured to identify the vulnerabilities of the other computing systems, attempt to gain access to the other computing systems, attempt to establish a new VPN connection to the other systems, and the like as described above.

In embodiments, the vulnerability database 116 can be configured to store exploits, application programs, commands, etc. utilized by the security tool 102. For example, the vulnerability database 116 can store the known exploits associated with the vulnerabilities stored in the vulnerability database 116. The vulnerability database 116 can be configured to store the identification of the exploits, application programs, system calls, etc. and details of the exploits, application programs, commands, etc. The details of the exploits, application programs, commands, etc. can include, for example, effects of the exploits, application programs, commands, etc.; description of the exploits, application programs, commands, etc. (e.g. algorithm, procedure); and a copy of the exploits, application programs, commands, etc. (e.g. copy of code, application program, instruction, etc.). To deliver and perform the exploits, application programs, commands, etc., the security tool 102 can be configured to search the vulnerability database 116 and to retrieve the exploits, application programs, commands, etc. from the vulnerability database 116.

In embodiments, the security tool 102 can be configured to provide an interface to the user of the security tool 102. The interface can be configured to allow the user to operate the security tool 102, such as initiating the security tool 102, selecting or identifying computing system to test and analyze, receiving or selecting exploits, application programs, commands, etc., interacting with the exploits, application programs, commands etc. via the VPN connection 114, and receiving data gathered during the testing and analysis. The interface can be any type of interface that allows the user to interact with the security tool 102 and receive data gathered by the security tool 102, such as command line interfaces and/or graphical user interfaces (GUIs). Likewise, the security tool 102 can be configured to provide the data gathered in any type of format, such as electronic mail (email), Hyper Text Markup Language (HTML) document, text or word processing document, and the like.

In embodiments, as described herein, the security tool 102 can be implemented and executed on any of the computing systems of environment 100 in order to test and analyze the security of a target computing system 104 and other computing systems of the network 200. For example, the security tool 102 can be implemented and executed on a remote computing system 112. In this example, the security tool 102 can remotely test and analyze the target computing systems 104 or any of the computing systems of the network 200 via the network 112. When configured as an application program, the security tool 102 can be stored on any type of computer readable storage medium, such as hard drives, optical storage, system memory, and the like, of the computing systems of the environment 100.

In embodiments, the security tool 102 can be configured to include the vulnerability database 116. Likewise, the vulnerability database 116 can be stored in a repository associated with any of the computing systems of the environment 100 and accessed remotely by the security tool 102. The repository can be stored any type of computer readable storage medium, such as hard drives, optical storage, system memory, and the like, of the computing systems of the environment 100. While FIG. 1 illustrates a single vulnerability database 116, one skilled in the art will realize that the vulnerability database 116 can comprise multiple databases. For example, the vulnerability database 116 can include a database for vulnerabilities and a database for exploits.

Figure 3:
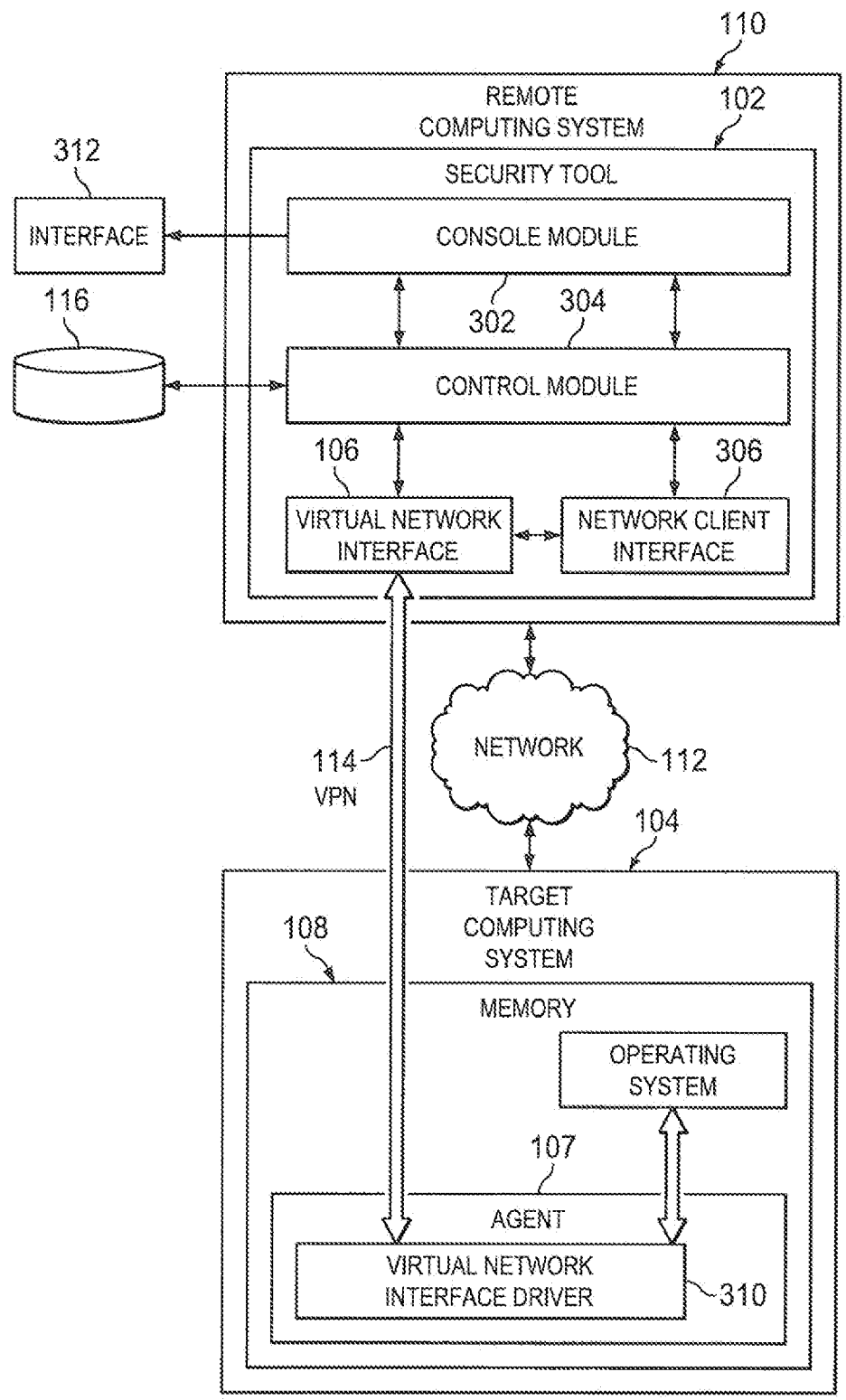
FIG. 3 is a block diagram of an exemplary configuration of the security tool and an agent, according to various embodiments.

FIG. 3 is a block diagram of an exemplary configuration of the security tool 102 and the agent 107. As illustrated, the security tool 102 can include a console module 302, a control module 304, a network client module 306, and the virtual network interface 106. The agent 107 can include a virtual network interface driver 310. While FIG. 3 illustrates various components of the security tool 102, and the agent 107 one skilled in the art will realize that existing components can be removed or additional components added.

In embodiments, the console module 302 can be configured to provide an interface 312 to the security tool 102. The console module 302 can be configured to generate the interface 312 that allow a user to initiate the security tool 102, to select or identify computing systems to test and analyze, to receive or select exploits, application programs, commands, etc., to interact with the exploits, application programs, commands etc. via the VPN connection 114, and to receive data gathered during the testing and analyze. To achieve this, the console module 302 can be configured to include the necessary logic, commands, instructions and routines to generate and communicate with GUIs and/or command-line interfaces. Likewise, the console module 302 can be configured include the necessary logic, commands, instructions and routines to output information in other formats, such as email, HTML document, text or word processing document, and the like.

In embodiments, the console module 302 can communicate with the control module 304. The control module 304 can be configured to perform the overall control and processing of the security module 102. For example, the control module 304 can be configured to receive and execute the commands from the user, to provide and control the agent 107, to provide and control the exploits, application programs, commands etc. via the VPN connection 114, to retrieve information from and store information in the vulnerability database 116, to receive and analyze data gathered from the target computing system 104. To achieve this, the control module 304 can be configured to include the necessary logic, commands, instructions and routines to communicate with and control the other modules of the security tool 102 and to communicate with and control the agent 107. Likewise, the control module 304 can be configured to include the necessary logic, commands, instructions and routines to search the vulnerability database 116 and to retrieve the information from and store information in the vulnerability database 116.

In embodiments, the control module 304 can be configured to communicate with the network client module 306 and the virtual network interface 106. The virtual network interface 106 can be configured to communicate with a virtual network interface created by the virtual network interfaced river 310 of the agent 107 in order to establish and maintain the VPN connection 114. To achieve this, the virtual network interface 106 can be configured to include the necessary logic, commands, instructions and routines to communicate with the virtual network interface driver 310 in order to establish the VPN connection 114 and send and receive communication over the VPN connection 114.

In embodiments, the network client module 306 can be configured generate and decode network communications received by the virtual network interface 106. For example, the network client module 306 can be configured to generate and decode transport layer (layer 4) communications, such as TCP and/or UDP communications. To achieve this, the network client module 306 can be configured to include the necessary logic, commands, instructions and routines to perform network communication operations as required by the security tool 102.

In embodiments, the virtual network interface driver 310 of the agent 107 can be configured to perform the operations of emulating a network interface device on the target computing system 104. The virtual network interface driver 310 can be configured to obtain and utilize network identifiers, such as media access control MAC addresses and IP address, in a manner to prevent the detection of the agent 107 by the target computing system 104 or other computing system associated with the target computing system 104. For example, the virtual network interface driver 310 can be configured to include the necessary logic, commands, instructions and routines to generate and send dynamic host configuration protocol (DCHP) requests to the network 300 to obtain an IP address and/or to perform network scans, such as address resolution protocol (ARP) scan, on the network 300 to identify unused IP addresses. Likewise, the virtual network interface driver 310 can be configured to establish, maintain, and communicate via the VPN connection 114 in a manner to prevent detection by the target computing system 104 or other computing system associated with the target computing system 104. To achieve this, the virtual network interface driver 310 can include the necessary logic, command, instruction and routines to generate and decode transport layer (layer 4) communications, such as TCP and/or UDP communications for the VPN connection 114. Likewise, the virtual network interface driver 310 can include the necessary logic, command, instruction and routines to receive network communications, such as packets, from the security tool 102 and deliver the network communications to the OS network stack of the computing system 104. Likewise, the virtual network interface driver 310 can include the necessary logic, command, instruction and routines to pass network communications, such as packets, from the OS network stack to the security tool 102.

In embodiments, as illustrated in FIG. 3, the components of the security module 102 can be implemented in a single application program capable of executing on the computing systems of environment 100. Likewise, the components of the security module 102 can be implanted as separate application programs that are capable of executing on separate computing systems of the environment 100.

Figure 4:
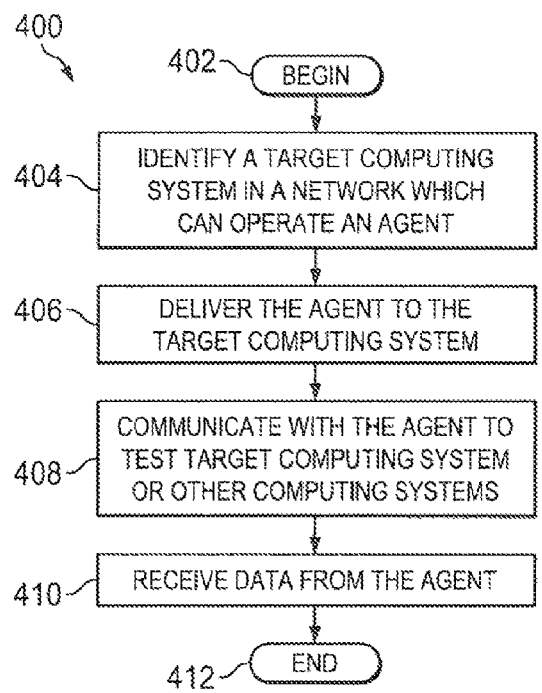
FIG. 4 is a flow diagram of exemplary processes performed by the security tool, according to various embodiments.

As mentioned above, the security tool 102 can be configured to test and analyze a computing system. FIG. 4 is a flow diagram that illustrates an exemplary process by which security tool 102 can test and analyze the security of the target computing system 104. In 402, the process can begin.

In 404, the security tool 102 can identify a target computing system in the network 200 which can operate the agent 107. The security tool 102 can scan the computing system of the network 200 to identify one or more of the computing systems that contains a vulnerability that allow the agent 107 to operate. For example, the security tool 102 can identify the target computing system 104 as being able to operate the agent 107. Likewise, the owners and/or administrators of the network 200 can allow the agent to be executed on the target computing system 104.

In 406, the security tool 102 can deliver the agent 107 to target computing system 104. The security tool 102 can transfer the agent 107 to the memory 108 of the target computing system 104 via the network 112. In one example to deliver the agent 107 without detection, the security tool 102 can transfer the agent 107 utilizing a vulnerability in the target computing system 104 and/or utilizing credentials of the target computing system 104. Likewise, in another example, the security tool 102 can transfer the agent 107 without concern for detection by the target computing system 104.

In 408, the security tool 102 can communicate with the gent 107 on the target computing system 104 via the virtual network interface 106 in order to test the security of the target computing system 104 and/or other computing systems connected to the target computing system 104. This process functions as the VPN connection 114 between the security tool 102 and the agent 107. The security tool 102 can be configured to test and analyze, via the VPN connection 114, the security of the target computing system 106 or the security of other computing systems in the network 200. The security testing can be any type of routine, procedure, algorithm, application program, data, series of commands, instructions, etc. which can test and analyze the security of the target computing system 104 or the security of other computing systems in the network 200, and provide data about the test to the security tool 102 via the VPN connection 114.

In 410, the security tool 102 can receive data from the agent 107 over the VPN connection 114. The data received from the agent 107 can be, for example, information collected by the security testing; network traffic between the target computing system 104 and other computing systems in the network 200; and the like.

In 412, the process can end, return to any point or repeat.

Figure 5:
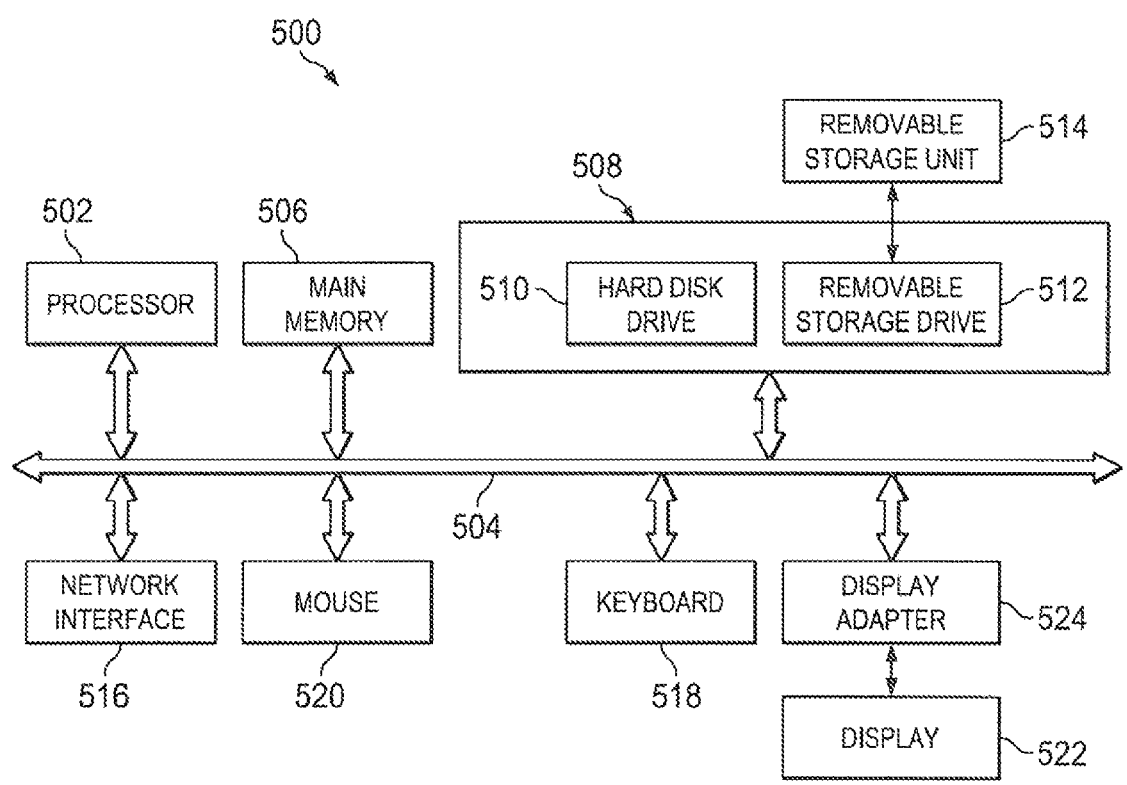
FIG. 5 is a block diagram of an exemplary computing system, according to various embodiments.

FIG. 5 illustrates an exemplary block diagram of a computing system 500 which can be implemented as the target computing systems 104 and/or the remote computing, system 110 according to various embodiments. In embodiments, the security tool 102 can be stored and executed on the computing system 500 in order to perform the process described above. Likewise, the security tool 102 can be stored and executed remotely and can be configured to communicate with the computing system 500 in order to perform the process described above. Additionally, the agent 107 can be stored and executed on the computing system 500 in order to perform the process described above. While FIG. 5 illustrates various components of the computing system 500, one skilled in the art will realize that existing components can be removed or additional components can be added.

As shown in FIG. 5, the computing system 500 can include one or more processors, such as processor 502 that provide an execution platform for embodiments of the security tool 102. Commands and data from the processor 502 are communicated over a communication bus 504. The computing system 500 can also include a main memory 506, for example, one or more computer readable storage media such as a Random Access Memory (RAM), where the security tool 102, the agent 107, and/or other application programs, such as an operating system (OS) can be executed during runtime, and can include a secondary memory 508. The secondary memory 508 can include, for example, one or more computer readable storage media or devices such as a hard disk drive 510 and/or a removable storage drive 512, representing a floppy diskette drive, a magnetic tape drive, a compact disk drive, etc., where a copy of a application program embodiment for the security tool 102 can be stored. The removable storage drive 512 reads from and/or writes to a removable storage unit 514 in a well-known manner. The computing system 500 can also include a network interface 516 in order to connect with the one or more networks 106.

In embodiments, a user can interface with the computing system 500 and operate the security tool 102 with a keyboard 518, a mouse 520, and a display 522. To provide information from the computing system 500 and data from the security tool 102, such as the report 110, the computing system 500 can include a display adapter 524. The display adapter 524 can interface with the communication bus 504 and the display 522. The display adapter 524 can receive display data from the processor 502 and convert the display data into display commands for the display 522.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method for security testing, comprising:
   identifying, by a source computing system, a target computing system in a network to execute an agent; wherein the agent executes on the target computing system without installing software on the target computing system and provides a virtual network connection to the source computing system;
   providing the agent to the target computing system for execution on the target computing system;
   performing, by the source computing system, a security test on the target computing system utilizing the virtual network connection established by the agent executing on the target computing system; and
   routing network communications from an additional computing system through the virtual network connection, wherein the routing causes the additional computing system to appear as a computing system on the network of the target computing system.

2. The method of claim 1, wherein the virtual network connection is encrypted.

3. The method of claim 1, wherein the agent executes in system memory of the target computing system.

4. The method of claim 1, wherein the virtual network connection is a layer 2 network connection.

5. The method of claim 1, wherein the security test comprises:
   an application program configured to test the security of the target computing system.

6. The method of claim 5, wherein the application program is at lea one of a network vulnerability scanner and an agent to gather configuration information of the computing system.

7. The method of claim 1, wherein the security test comprises:
a command configured to cause the target computing system to perform an action that compromises the security of the target computing system.

8. The method of claim 7, wherein the command is at least one of a command to route network traffic to the source computing system, an application programming interface (API) call configured to fork a new process in the target computing system, an API call configured to disable an application program executing on the target computing system, and an API call configured to emulate local API calls.

9. The method of claim 1, the method further comprising:
identifying credentials of the target computing system that allows the agent to be delivered to the target computing system.

10. The method of claim 1, the method further comprising:
communicating with the agent via the virtual network connection to perform a security test on a second computing system.

11. A non-transitory computer readable storage medium storing instructions that cause a processor to perform a method comprising:
identifying, by a source computing system, a target computing system in a network to execute an agent; wherein the agent executes on the target computing system without installing software on the target computing system and provides a virtual network connection to the source computing system;
providing the agent to the target computing system for execution on the target computing system;
performing, by the source computing system, a security test on the target computing system utilizing the virtual network connection established by the agent executing on the target computing system; and
routing network communications from an additional computing system through the virtual network connection, wherein the routing causes the additional computing system to appear as a computing system on the network of the target computing system.

12. The non-transitory computer readable storage medium of claim 11, wherein the virtual network connection is encrypted.

13. The non-transitory computer readable storage medium of claim 11, wherein the agent executes in system memory of the target computing system.

14. The non-transitory computer readable storage medium of claim 11, wherein the agent injects network frames at a data link layer of a network interface of the target computing system to establish the virtual network connection.

15. The non-transitory computer readable storage medium of claim 11, wherein the security test comprises:
an application program configured to test the security of the target computing system.

16. The non-transitory computer readable storage medium of claim 15, wherein the application program is at least one of a network vulnerability scanner and an agent to gather configuration information of the computing system.

17. The non-transitory computer readable storage medium of claim 11, wherein the security test comprises:
a command configured to cause the target computing system to perform an action that compromises security of a second computing system.

18. The non-transitory computer readable storage medium of claim 17, wherein the command is at least one of a command to route network traffic to the source computing system, an application programming interface (API) call configured to fork a new process in the target computing system, an API call configured to disable an application program executing on the target computing system, and an API call configured to emulate local API calls.

19. The non-transitory computer readable storage medium of claim 11, the method further comprising:
identifying credentials of the target computing system that allows the agent to be delivered to the target computing system.

20. The non-transitory computer readable storage medium of claim 11, the method further comprising:
communicating with the agent via the virtual network connection to perform a security test on a second computing system.

21. A source computing system, comprising;
a memory storing instructions; and
a processor coupled to the memory and configured to execute the instructions to perform a method comprising:
identifying, by the source computing system, a target computing system in a network to execute an agent; wherein the agent executes on the target computing system without installing software on the target computing system and provides a virtual network connection to the source computing system;
providing the agent to the target computing system for execution on the target computing system;
performing, by the source computing system, a security test on the target computing system utilizing the virtual network connection established by the agent executing on the target computing system; and
routing network communications from an additional computing system through the virtual network connection, wherein the routing causes the additional computing system to appear as a computing system on the network of the target computing system.

22. The source computing system of claim 21, wherein the virtual network connection is encrypted.

23. The source computing system of claim 21, wherein the agent executes in system memory of the target computing system.

24. The source computing system of claim 21, wherein the agent injects network frames at a data link layer of a network interface of the target computing system to establish the virtual network connection.

25. The source computing system of claim 21, wherein the security test comprises:
an application program configured to test the security of the target computing system.

26. The source computing system of claim 25, wherein the application program is at least one of a network vulnerability scanner and an agent to gather configuration information of the computing system.

27. The source computing system of claim 21, wherein the security test comprises:
a command configured to cause the target computing system to perform an action that compromises security of a second computing system.

28. The source computing system of claim 27, wherein the command is at least one of a command to route network traffic to the source computing system, an application programming interface (API) call configured to fork a new process in the target computing system, an API call configured to disable an application program executing on the target computing system, and an API call configured to emulate local API calls.

29. The source computing system of claim 21, the method further comprising:
   identifying credentials of the target computing system that allows the agent to be delivered to the target computing system.

30. The source computing system of claim 21, the method further comprising:
   communicating with the agent via the virtual network connection to perform a security test on a second computing system.

* * * * *